United States Patent [19]

Chow et al.

[11] Patent Number: 5,699,427
[45] Date of Patent: Dec. 16, 1997

[54] METHOD TO DETER DOCUMENT AND INTELLECTUAL PROPERTY PIRACY THROUGH INDIVIDUALIZATION

[75] Inventors: Chee-Seng Chow, Briarcliff Manor, N.Y.; Shay Kutten, Rockaway, N.J.; Marcell Mordechay Yung, New York, N.Y.

[73] Assignee: International Business Machines Corporation, Armonk, N.Y.

[21] Appl. No.: 494,615

[22] Filed: Jun. 23, 1995

[51] Int. Cl.⁶ ............................................. G11B 23/28
[52] U.S. Cl. ..................................... 380/3; 380/55
[58] Field of Search .......................... 380/51, 4, 23, 380/55, 3; 395/145

[56] References Cited

U.S. PATENT DOCUMENTS

| | | |
|---|---|---|
| 5,371,792 | 12/1994 | Asai et al. ........................ 380/3 |
| 5,460,374 | 10/1995 | Owaki ............................. 380/3 |
| 5,467,447 | 11/1995 | Vogel ............................. 395/145 |
| 5,513,169 | 4/1996 | Fite et al. ....................... 380/3 |
| 5,513,260 | 4/1996 | Ryan ............................. 380/3 |
| 5,530,757 | 6/1996 | Krawczyk ....................... 380/23 |
| 5,568,550 | 10/1996 | Ur ................................. 380/3 |
| 5,627,655 | 5/1997 | Okamoto et al. .................. 380/3 |

*Primary Examiner*—David C. Cain
*Attorney, Agent, or Firm*—Douglas W. Cameron

[57] ABSTRACT

A system for identifying the authorized receiver of any particular copy of a document. More specifically, each particular copy of a document is fingerprinted by applying a set of variations to a document, where each variation is a change in data contents, but does not change the meaning or perusal experience of the document. A database associating a set of variants to a receiver is maintained. Thus any variant or copy of that variant can be traced to an authorized receiver.

22 Claims, 7 Drawing Sheets

| DOCUMENT ID | DOCUMENT CONTENT AND VARIATIONS |
|---|---|
| DOC-1 | CONTENT AND ALL POSSIBLE VARIATIONS FOR DOC-1 |
| DOC-2 | CONTENT AND ALL POSSIBLE VARIATIONS FOR DOC-2 |
| DOC-3 | CONTENT AND ALL POSSIBLE VARIATIONS FOR DOC-3 |

FIG. 4

| DOCUMENT CONTENT | LOCATION INFORMATION | LOCAL VARIATIONS | 3 1 2 |
|---|---|---|---|
| CONTENT OF DOC-1 | LINE 1, WORD 3 | 2, TWO II | |
| | LINE 2, WORD 4 | CONSIST, COMPOSED | |
| | LINE 10, WORD 2 | AT LEAST TWO, MORE THAN ONE | |

FIG. 5

| DOCUMENT ID | VARIANT | RECIPIENT INFORMATION |
|---|---|---|
| DOC-1 | (1, 1, 1, ...) | JOHN DOE, 4/26/95, PAID $100, .... |
|  | (2, 1, 1, ...) | BILL CLINTON, 4/26/95, PAID $0, .... |
|  | (3, 1, 1, ...) | |
| DOC-2 | (1, 1, 1, ...) | DAN QUAYLE, 3/26/95, PAID $10, .... |
| DOC-3 | | |

METHOD TO DETER DOCUMENT AND INTELLECTUAL PROPERTY PIRACY THROUGH INDIVIDUALIZATION

TECHNICAL FIELD

This invention relates to a copy protection system. More specifically, a selected set of local variations to the contents of a document is applied to each copy of the document to identify the source of unauthorized copies of a document.

SUMMARY OF THE INVENTION

This invention is a document copy protection system designed to discourage the unauthorized copying or distribution of a document. A number of variants of the document are generated by applying particular sets of variations to the document. Each set of variations when applied generates a particular variant of the document. Each variation of the set changes the content of the document without changing the meaning or perusal experience of the reader or viewer. This variant is then distributed to an authorized receiver. A database is then maintained associating each variant of the document with a particular authorized receiver. The receiver of any one variant of the document can then be identified using the database. Unauthorized copying or distribution of the document can be traced at least to a receiver according to which variant of the document was copied or distributed without authorization.

A variation in the document could be something like the use of a synonym for a particular word or the use of a pronoun in place of its antecedent in the document. In general, we change a word or a group of words in the document without modifying the meaning or the perusal experience of the reader. Other specific examples of variations will be shown below. The application of a set of variations to the document is then used to fingerprint the document so as to uniquely identify it.

While this invention will be illustrated in terms of text data, it can also be applied to video streams, where the variations might be a change in the color of objects shown in the video stream.

The important point is that a relatively small number of(say 30) independent vits can produce one billion (1,000,000,000) variants, more than one would possibly need. A little extra effort by the author during the creation process can make the individualization very difficult or impossible to remove by any software or mechanical means.

DESCRIPTION OF THE PRIOR ART

The work of [1] suggests putting markings, or noise bits, in frames of digital movies. It assumes that one can modify a small number of bits per frame without affecting the viewing experience. The focus of the work is on the encoding of these bits so that collaboration between pirates not only cannot erase the markings but results in incriminating the collaborators. The work of [6] provides a detailed mathematical analysis of coding techniques that prevent collaborators from incriminating others.

However since the markings [1] are noise bits, there is no guarantee that they do not affect the viewing experience and that the markings are not affected when compressed and uncompressed with lossy compression process during transmission (e.g., MPEG). Moreover, it may be possible to obscure the markings by adding special noise or filter them using some special digital filters.

Our invention, for example, modifies the video stream at the content-level (e.g., the absence, location, or color of objects in the movie). It may require more work by the author or the movie producer, but the individualization information cannot be destroyed by any automatic means without rendering the content unusable.

The work of [2,3,4] uses spacing between lines of text or spacing between words in a document to encode the identity of the document receiver. Minor variations in certain letters (e.g., in the letter "1") are also been suggested. Variations in fonts or type face have been suggested in [5]. However, these variations are by nature analog and are distorted during photocopying. More significantly, they can be filtered by special softwares.

In particular, from a hard copy of a document, a pirate can use an optical scanner to digitize the document and automatically re-adjust the line or word spacings by softwares. The pirate can also use optical character recognition (OCR) softwares to remove the spacing and type face information.

The removal of the spacing information is even easier if a softcopy of the document is available, say in a high-level printer format (e.g., postscript). The spacing information can be removed by a simple program that understands the print format. The program that is used to identify the spacing information in the document can be modified to remove the information from the document.

Other drawbacks of the work described in [2, 3,4] are, as with a hardcopy of the document, the user must use an optical scanner to digitize the document before being able to identify the document receiver. The work in [2, 3, 4] is not applicable if the document is distributed in plain text (e.g., ASCII format) which does not support spacing variations between lines. It is not clear how the work in [2,3,4] can be applied to other forms of intellectual properties, e.g., softwares, videos, and music, which do not support spacing variations.

The work in [5] describes the taxonomy of fingerprinting in documents and gives various examples of fingerprinting methods. One example involves introducing small deviations in length measurements in the text (e.g., change 0.5 meter to 0.45 meter). Another example described is introducing bogus entries in patient's medical record as fingerprints. Other fingerprinting methods mentioned in [5]are introducing minor variations in softwares, introducing errors in maps, and rounding errors in mathematical tables.

However, such variations in essence introduce errors in the document content, potentially resulting in errors by the document user. For example, bogus entries in a patient's medical record may confuse a doctor and cause him to mis-diagnose the patient. Perturbing the least significant digits in a series of measurements may change the measurement average (or other higher order statistics), resulting in faulty conclusions by the document user. Lastly, introducing minor variations in softwares may cause the program to mis-behave or produce different outputs when run in different operating environments.

Watermarking is another form of fingerprinting technique. For example, an often used watermarking scheme is to put a faintly visible image of a seal, a logo, or some words such as "Top Secret" across every page of the document. This can be easily done in digital media. Other kinds of "watermarks" are placing the name of the publisher, the company, or the document receiver at the beginning, the footer of every page, or the end of the document.

However such fingerprinting are methods "visible" and affect the perusal experience of the document user. In particular, they are noticeable, distracting, and may interfere with the viewing of the document. They affect the perusal experience of the document user.

In many cases the visible fingerprints can be removed or obliterated from the document. A pirate may be motivated to do so as the marks are visible. Other fingerprinting methods such as putting some seemingly random digits or some "noise" symbols in a document also affect the perusal experience of a document user as they are also readily noticeable. Again a pirate may be motivated to remove or destroy these visible marks.

DESCRIPTION OF THE PREFERRED EMBODIMENT

Our invention introduces local variations to the content of a document without changing the meaning of the document. In the case of a textual document, a variation in content is a change to a word or a group of words, or more generally a symbol or a group of symbols. In the case of an image or a video stream, a content variation is a change in the size, the shape, the color, the location, or other visual qualities of an object or group of objects in the image or the video stream. In the case of an audio stream, a content variation means the loudness, the duration, the pitch, or other tonal qualities of an audio element or a group of audio elements in the audio stream.

The document variations do not modify the meaning of the document in that it does not add information to or remove information from the document; in particular, the changes do not introduce errors to the document or result in erroneous conclusions or actions by the document user.

Furthermore, the variations are chosen so that they do not affect the perusal experience of the document user. The variations are not noticeable. (Unless a person has two variants of the document and specifically look for the differences between them.)

Figure 1:
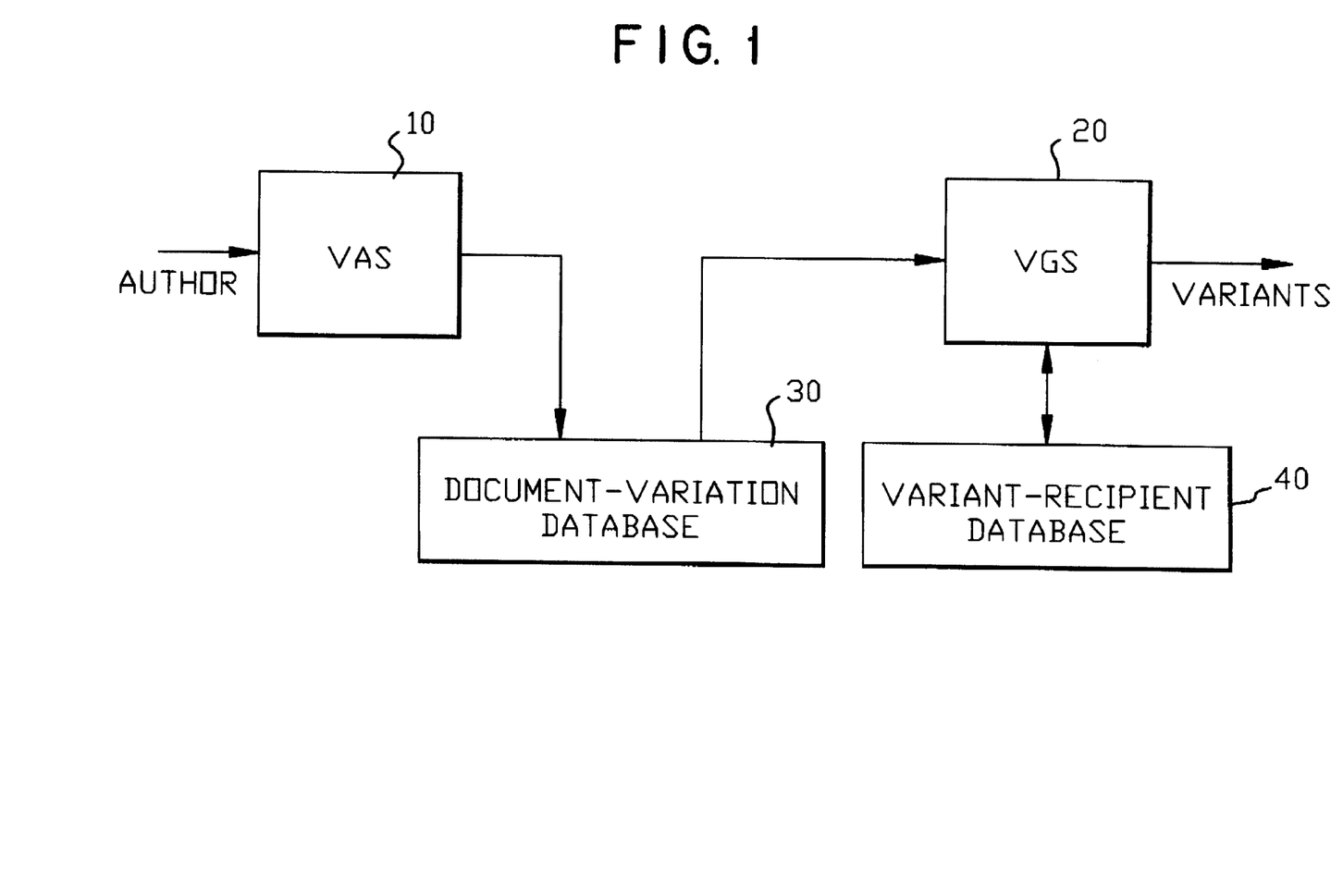
FIG. 1 illustrates a document fingerprinting system in accordance with the invention.
Figure 7:
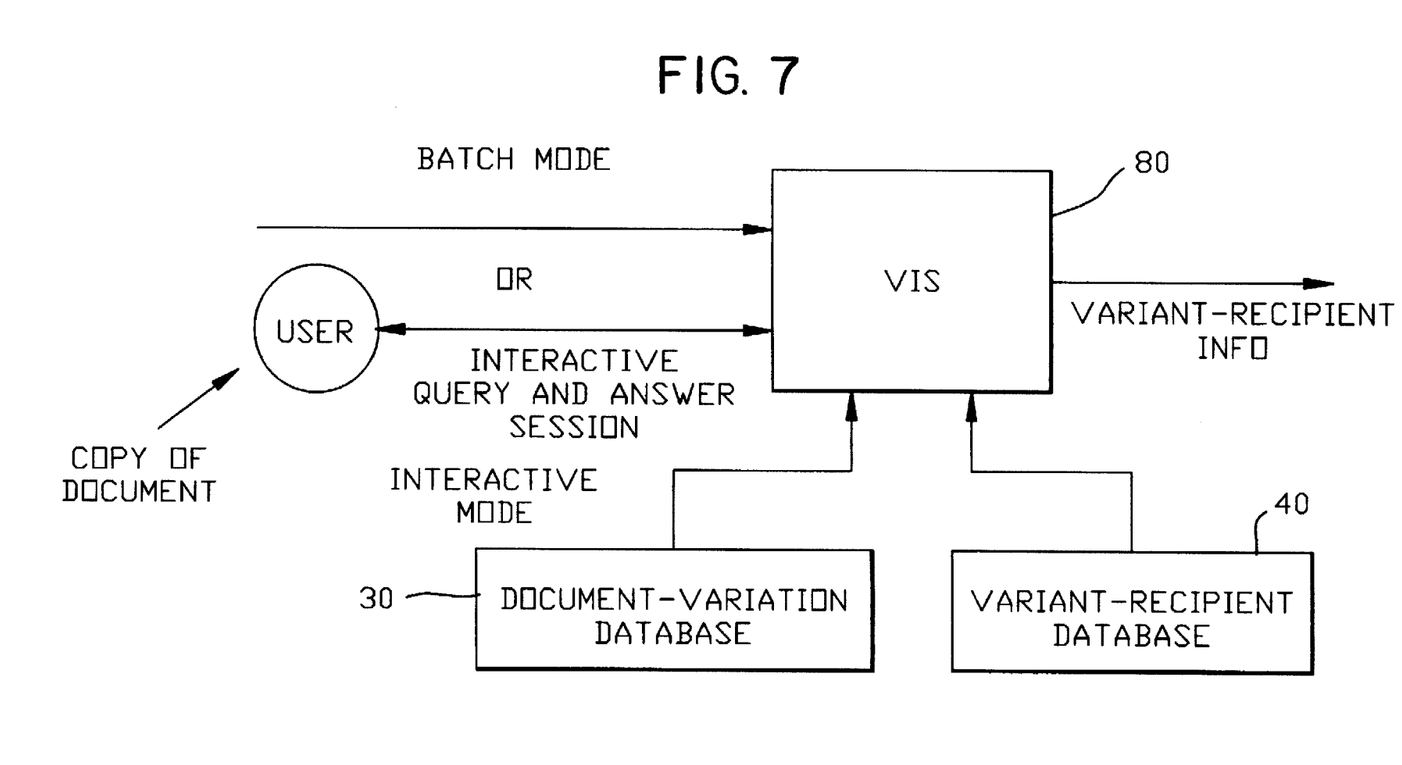
FIG. 7 graphically illustrates the two modes of operation of the variant identification system (VIS) 80.

Referring to FIG. 1, the system of this invention consists of the following sub-systems:
 a Variation Authoring System (VAS) 10
 a Variant Generation System (VGS) 20
 a Variant Identification System (VIS) 80 (See FIG. 7)

and the following storage repositories:
 a Document and Variation Database 30
 a Variant and Recipient Database 40

Referring to FIG. 1, the VAS 10 supports all the basic functions of a typical text editor and word processors. It shows an author using the VAS 10 to create a document and its variations. The result is stored in a document-variation database 30. When a fingerprinted copy (a variant) of the document is needed, the VGS 20 reads from database 30, generates a unique variant of the document, and updates the variant-recipient database 40.

In addition, the VAS allows an author to introduce and edit local variations in a document. During the composition or editing phase, the author creates independent local variations to the document.

Figure 2:
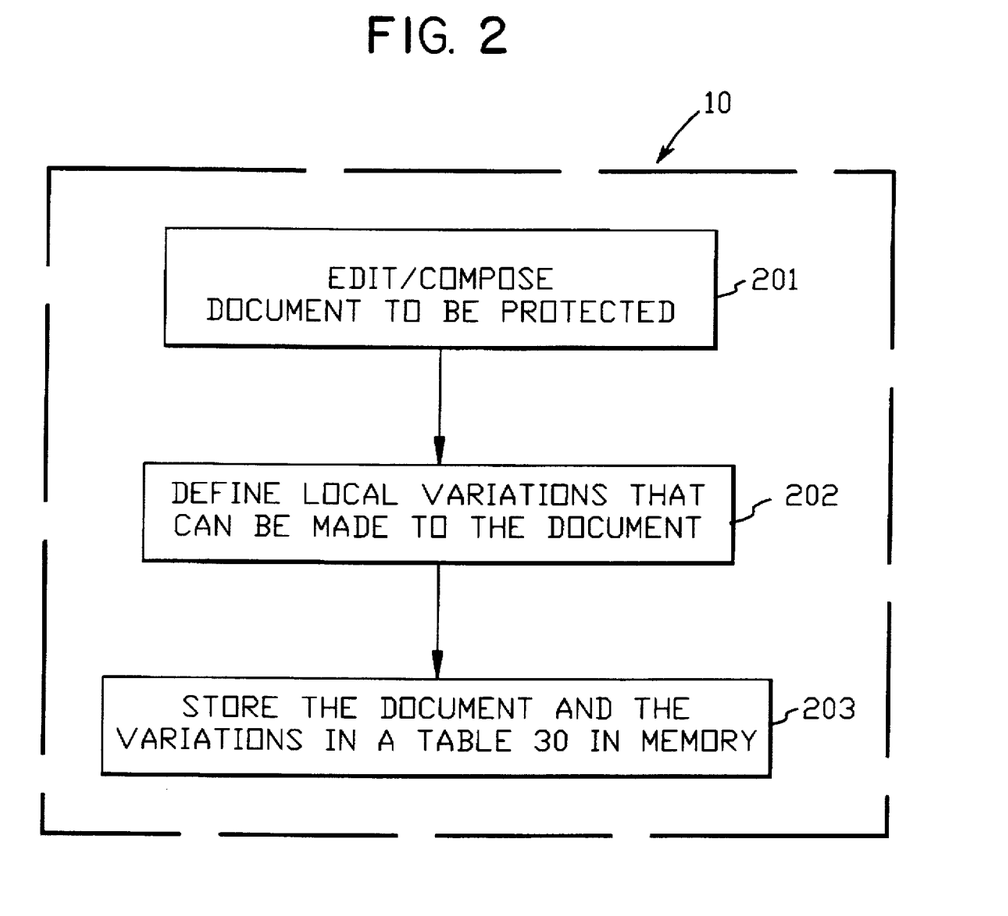
FIG. 2 illustrates the major functions of the Variation Authorizing System (VAS) 10.

Referring to FIG. 2, we describe the steps taken by an author using the VAS. First (201), an author edits or composes the document. This involves the basic functions of a typical text editor and word processors. Second (202), local variations that can be made to the document are defined. Finally (203), the document and its possible variations are stored in a table 30 in memory. The document variations will be defined below.

In the second step (202), the VAS provides the following range of help in the creation of local variations:

Manual—It may simply provide a simple GUI (Graphical User Interface) to add or edit local variations. It may also provide a formal language to describe the variations.

Semi-automatic—It may interactively suggest local variations and provide dictionary, thesaurus, and grammar checker assistance to allow the author to compose using local variations using synonyms, alternate expressions, different punctuation choices. The system may, e.g., highlight places with local variations in the document using a different color. A list of possible local variations appear in the subsequent section.

Automatic—It may introduce local variations automatically with little or no intervention from the author. It could use a table of equivalent spellings, synonyms, equivalent phrases, and so forth, that automatically or semi-automatically provide variations.

Figure 3:
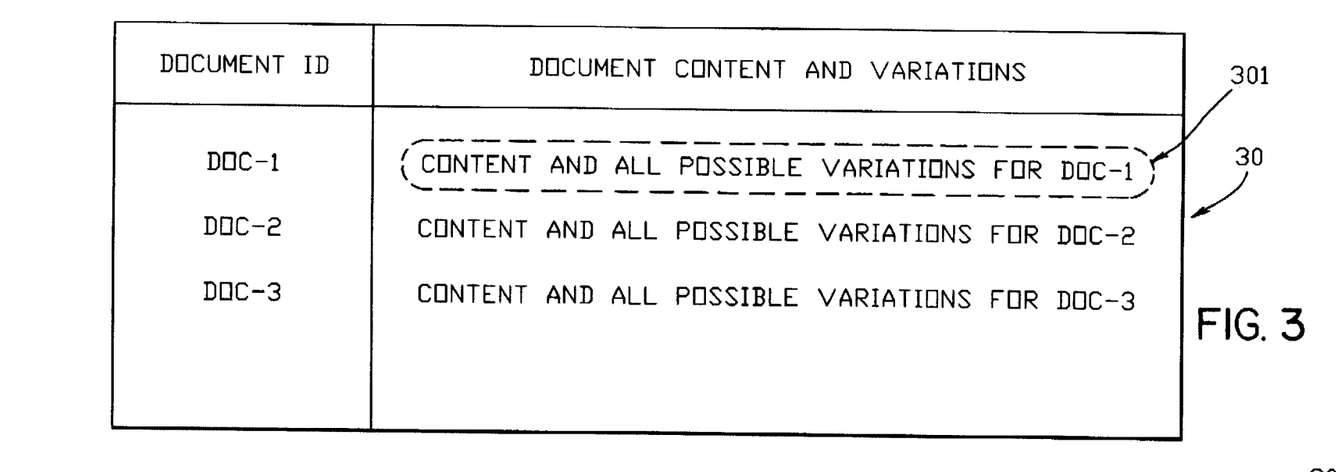
FIG. 3 graphically illustrates the document-variation table 30. Each entry of the table 30 is represented by a row of two columns. The first column stores the document identifier (e.g., DOC-1), which act as an index into the table. The second column stores the document content and the set of all possible local variations to the document.

FIG. 3 illustrates how the document and its variations are stored in the database 30. For each document, the table stores the document content and its variations. The first column stores the document identifier (e.g., DOC-1), which acts as an index into the table 30. The second column stores the document content and its possible variations (301). It contains sufficient information to generate all possible variants of the document.

Figure 4:
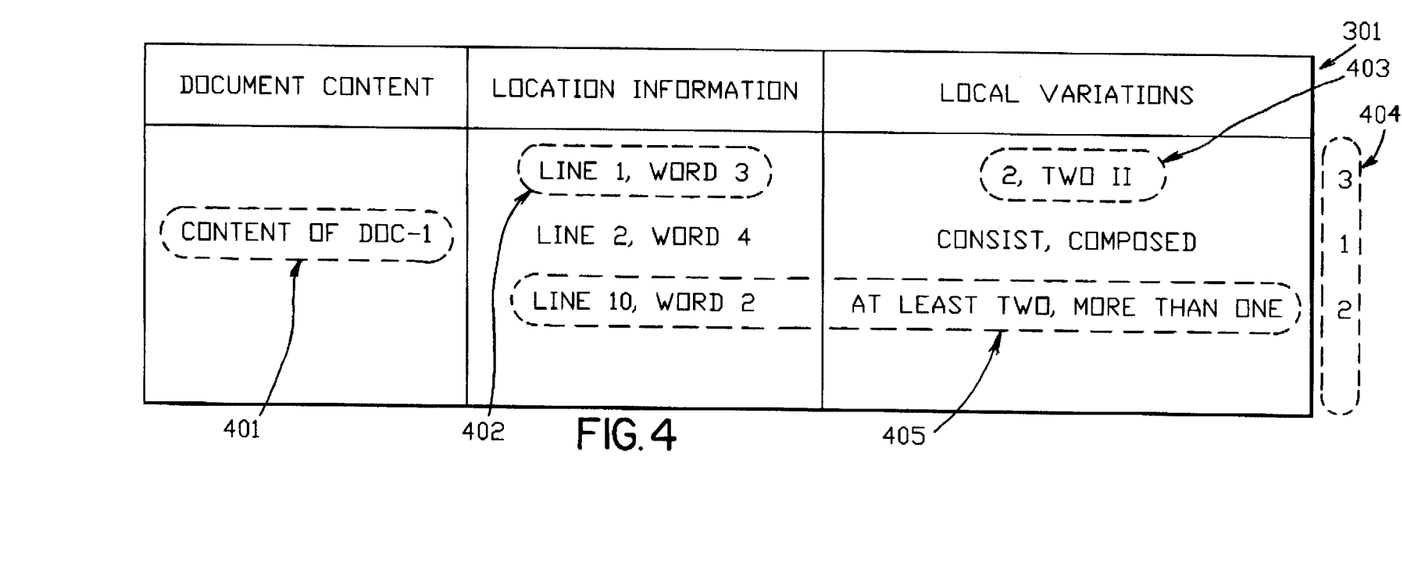
FIG. 4 illustrates an entry 301 of the document-variation table 30. It shows an efficient representation for storing the set of all possible variations to the document.

There are many different ways to represent a document and its variations. Referring to FIG. 4, we give an example of how the content and the variations of DOC-1 can be efficiently stored. The first part (401), represented by the first column of table 301, contains the document content. The second part (402), represented by the second column of table 301, stores the location of a variation.

The third part (403), represented by the third column of table 301, stores the local variations at the location specified in the second column (402). Referring to FIG. 4, 402 and 403 say that the third word in the first line of the document DOC-1 can be replaced by one of "2", "TWO", or "II". A variant to a document can be uniquely represented by a tuple of numbers 404 where each element in the tuple corresponds to a choice of local variation applied to the document. In the example, the tuple "(3, 1, 2, . . .)" corresponds to applying the local variations "II", "consist", and "more than one" to the original document.

Figure 5:
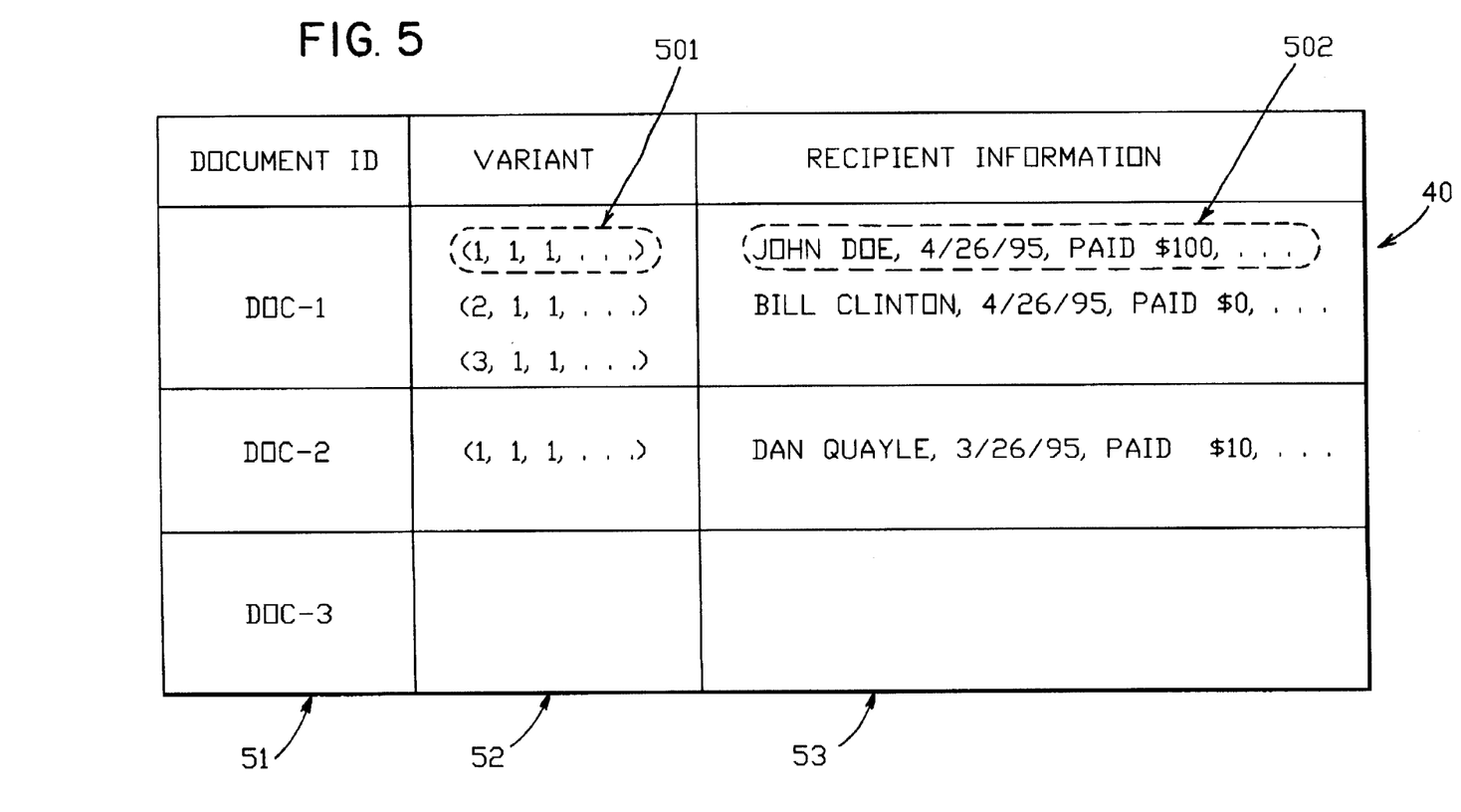
FIG. 5 illustrates the recipient-variant table 40. The first column stores the document identifier, which acts as an index to the table 40. The second column stores the variant of the document, and the third column stores information on the recipient of the variant.

Referring to FIG. 5, the VGS (Variant Generation System) 20 (See FIG. 1) maintains a database 40 of the variant issued (501), and the recipient information (502) of the variant, for each document. The information is stored in a table of three columns. The first column 51 stores the document identifier (e.g., DOC-1), which acts as an index into the table 40. The second column 52 stores the variant issued (501). The variant could simply be a tuple (or code word) that specifies the variant among all possible variants of the document. The third column 53 stores information on the recipient (503) of the variant (e.g., name, date of document issue, request information).

When a copy of the document is needed, the VGS 20 looks up the document-variation table 30 (See FIG. 3) and the recipient-variant table 40 to generate a new variant, one that has never been issued before. The variant and the recipient information are added to the database 40. Each receiver gets a unique fingerprinted copy, that is a variant, of the document. The generation system may allow the document distributor to specify a particular variant for an individual based on knowledge about the individual's interests.

Figure 6:
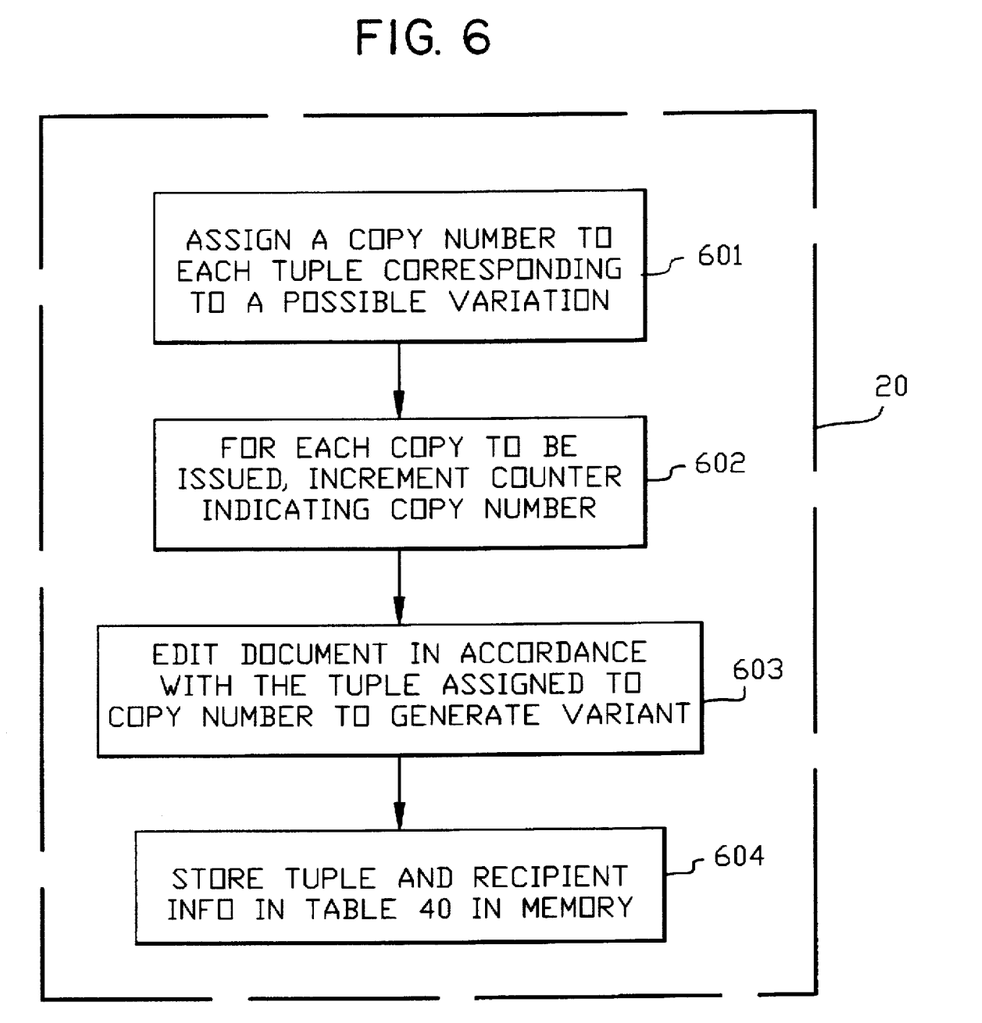
FIG. 6 illustrates the major functions of the variation generation system (VGS) 20.

Referring to FIG. 6, we describe the steps a VGS takes to generate a variant (e.g., of DOC-1) so that each recipient in the recipient-variant database 40 receives a unique fingerprinted copy, that is a variant, of the document. First (601), assign a copy number to each tuple corresponding to a possible document variant. This step does not require the actual enumeration of all possible document variants (as there many be too many of them). It suffices to linearly order all the variants (e.g., using dictionary ordering). Second (602), for each copy to be issued increment the counter (which had been initialized to zero at the beginning) indicating copy number. Third (603), edit the document in accordance with the tuple assigned to the copy number to generate a variant of the document. Finally (604), store the tuple and recipient information in the recipient-variant table 40 in memory.

Referring to FIG. 7, the VIS (Variant Identification System) 80 identifies the recipient of a variant using information from the document-variation table 30 and the variant-recipient table 40 when given a copy of the document. It is assumed that the VIS is given the document identifier (e.g., DOC-1). This system can operate in one of two modes:

batch mode—when a copy of the document is provided as input into the system.

interactive mode—when only a hardcopy of the document is available, where a human user interacts with the system in an interactive query session. In this mode the human user acts as the "eyes" to the VIS 80 to help identify the variant and the recipient of the variant.

Figure 8:
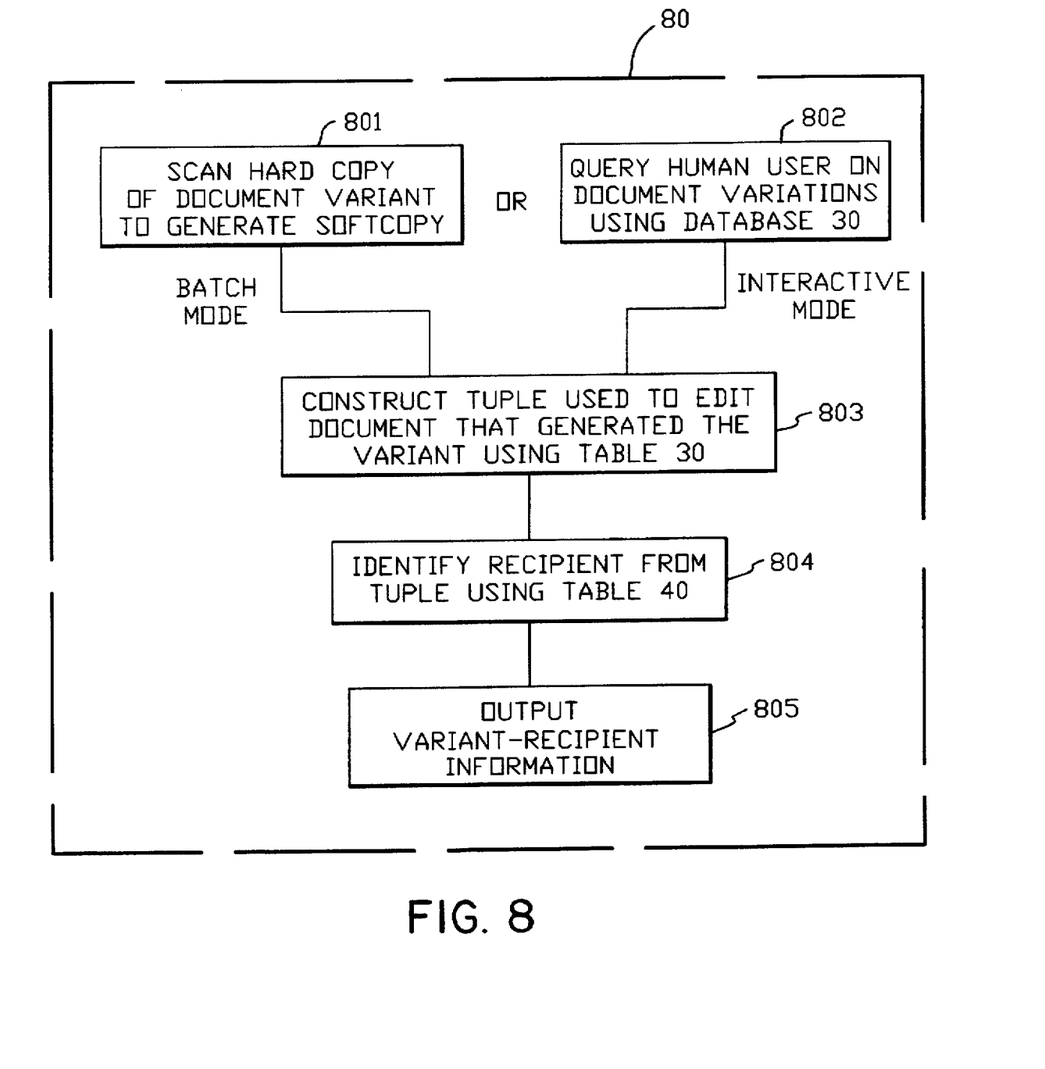
FIG. 8 graphically illustrates the major functions of the variant identification system (VIS) 80.

Referring to FIG. 8, we describe the operation of the VIS 80 to identify the recipient. We first consider the batch mode. We assume that the user has a hardcopy of the document. First (801), scan the document into the system using an optical scanner and use a commercially available optical character recognition (OCR) program (such as OmniPage, Recognita, TextBridge, or WordScan) to extract text information from the scanned image. If a softcopy of the document is available, the steps in 801 can be simplified by directly extracting the textual information from the softcopy. For example, if the softcopy is an image of the document, then one can use an OCR program to extract textual information from the document. If the document is in a high-level format, such as dvi (device independent fortnat), postscript, or html (hypertext markup language), then there are commonly available text filters which convert the document into plain text format. If a filter for a specific format is not available, it is usually easy to write a program for the filter. Second (803), using the document-variation table 30, a tuple corresponding to the variant is constructed. Third (804), the recipient information is retrieved from the variant-recipient table 40. Finally (805), the variant-recipient information is output from the VIS. Note that, to improve efficiency steps 803 and 804 can be combined so that there is no need to construct the entire tuple to identify the recipient of the variant.

In the interactive mode, the steps of FIG. 8 are similar, except that 801 is replaced by 802. The VIS looks up the content and variations entry (e.g, DOC-1) 301 in the document-variation table 30. Using location information 402 and variation information 403 (See FIG.4), the VIS queries the human user about the local variations in the variant. (E.g., is the 3rd word in the first line of the document "2", "TWO", or "II"?) Based on the answers received from the human user, it constructs a tuple corresponding to the variant. The rest of the steps are as before. Note that, for efficiency, steps 802, 803, and 804 can be combined to identify the variant recipient with the minimal number of queries to the human user.

Types of Local Variations

A non-exhaustive list of possible individualization information is as follows:
Different spellings: can't or cannot, center or centre.
Synonyms: quick or rapid, car or automobile.
Absence or presence of certain qualifiers: big or really big.
Equivalent phrases, sentences, or paragraphs.
Variation in punctuations.
Reordering of items in a list, sentences, and paragraphs.
Different symbols to label figures, footnotes, sections, references, citations, and equations.
Different equivalent representations of mathematical objects (e.g., "the square root of 2", sqrt(2), $\sqrt{2}$, or $2^{0.5}$).
Location of a figure within a page (e.g., top, bottom, left, right, center).
Adding unnoticeable information in a picture (green dots in blue background).
Minuscule changes in a music track.

The basic idea is to create local independent variations. For ease of reference we refer to a binary choice of two local variations as a vit. In the case where a location has N choices (N>2) then the number of vits at the location is logarithm (base 2) of N.

Cryptographic Techniques to Detect Modifications

The basic system can be augmented with a publicly verifiable modification detection scheme. (Such schemes are well-known in the art. For example, see any of the modern texts on cryptography, such as [7,8].) One possible implementation is as follows:

The author chooses a secret private key S and publishes the corresponding public key P.

Each document contains an optional visible header that identifies the document receiver, the document body containing hidden individualization information, and a verifiable modification detection trailer.

The modification detection trailer is computed by applying a strong one-way hash function (e.g., MD5) to the header and the document body. The resultant hash-value is decrypted using the author's private key S.

The public can detect modifications to the document as follows. First, apply the hash function to the header and document body resulting in a first value. Then, use the public key P to encrypt the trailer resulting in a second value. If the two values are different, then some one has tampered with the document. (It could be the header, the document body, or the trailer). Otherwise, the document has not been modified except For a negligible probability.

If a secure hardware is available (e.g., a secure display, a secure disk drive, or any secure hardware that can hold a secret key and perform some rudimentary cryptographic operations such as hashing), then the aforementioned modification detection technique can be enforced by the hardware.

The scheme can be augmented by automatically adding redundant vits (See 405 FIG. 4) that bind the chosen sequence of tagging vits (See 404 FIG.4) via a cryptographic operation (e.g., a hash function of the tagging vits). One can think of the tagging vits as the fingerprint that identifies (or tags) the document and the augmented vits as the trailer. The secure hardware first performs the same cryptographic operation on the tagging vit to verify that the resultant hash value matches the augmented vits. Only if the hash value matches the augmented vits, the secure hardware performs the required operation (e.g. display the document in the case of a secure display).

Modifications to the document are very hard to perform. First, at least two variants of the document are needed to detect differences (vit locations). Second, one can introduce redundancy in the vit encoding (e.g., using error correction coding techniques well known in the art, see [9]) to correct random modifications. Third, the tagging vits and the augmented vits may have some functional connection that the system check. (E.g., the functional connection may be a cryptographic hashing, as described above.) Ruining this connection will cause the system to reject the document, rendering the document unusable.

Coding Techniques Against Collaborators

Encoding schemes such as those in [1,6] can be used to prevent collaborating pirates From obtaining multiple copies of a document and erasing the individualization information. For simplicity assume that each local variation consists of a binary choice, e.g., two different spellings, two synonyms, or two equivalent phrases. Therefore, a particular variant can be represented by a binary string.

Here is one possible encoding scheme that has been analyzed in [6]. Other more efficient coding techniques can also be Found in [6] scheme allows the detection and identification of collaborators with high probability. The first variant uses "100000000 . . . ", the second "010000000 . . . ", the third "0010000 . . . ", and so forth. Suppose the first and the third collaborate. Then the two can identify the second and third locations of variation. They is a 1/4 chance of erase the individualization information by choosing "000000000 . . . ". They is also an equal chance of choosing "10100000 . . . " which incriminates the collaborators. In any case, the information they have with two copies does not help them incriminate the second or another innocent party.

Standard error-correction coding techniques, e.g., using multiple vits (local variations) to encode a "1" or "0" can be used reduce the probability of erasing the marks and increase the probability of incriminating the collaborators. (See [9] for various coding techniques.) For example, if three vits were used to encode a "1" or "0", then the probability of two collaborators erasing the individualization information is 1/256 and the probability of incriminating both of them is approximately 1–1/256.

Extensions of Basic Embodiment

In the case the document is a digitally generated picture, the VAS (see FIG. 1) would be a computer drawing program (e.g., idraw, xfig, and corel draw) modified to support the authoring of vits. A vit can be represented by the size of an object (say a particular leaf in a tree), the location of an inconspicuous object (say a pencil on a desk), or the color of a certain object (say a white, pink, or black vase).

In the case the document is a digital video stream, the VAS (see FIG. 1) would be a MPEG editor (or the appropriate editor suitable for the stream format) modified to support the authoring of vits. A vit would a sequence of modifications to an object in every frame of the stream, where the object in each frame is modified as in a digital picture.

In the case the document is a digitally mastered sounds tracks and music, the VAS (see FIG. 1) would be a digital audio editor (such as one commonly available in many commercially available multimedia systems from, e.g., Creative Labs, Reveal, and Diamond) modified to support the authoring of vits. A vit can be represented by the loudness of certain instruments, the duration of certain notes, and other tonal qualities of certain segments.

References

[1] G. R. Blakley, C. Meadows, G. B. Purdy, "Fingerprinting Long Forgiving Messages", Crypro '85.

[2] J. T. Brassil, S. Low, N. F. Maxemchuk, and L. O'Gorman, "Electronic Marking and Identification Techniques to Discourage Document Copying", in Proceedings of IEEE Infocom '94 (Toronto, Canada), pp. 18–22, June 1994.

[3] A. K. Choudhury, N. F. Maxemchuk, S. Paul, and H. G. Schulzrinne, "Copyright Protection for Electronic Publishing over Computer Networks", IEEE Network Magazine, June 1994.

[4] S. H. Low, N. F. Maxemchuk, J. T. Brassil, L. O'Gorman, "Document Marking and Identification using both Line and Word Shifting", AT&T Technical Report, 1994.

[5] N. R. Wagner, "Fingerprinting", Proceedings of the 1983 Symposium on Security and Privacy

[6] D. Boneh and J. Shaw, "Collusion-Secure Fingerprinting For Digital Data", Department of Computer Science, Princeton University Technical Report, 1995.

[7] B. Schneier, "Applied Cryptography: Protocols, Algorithms, and Source Code in C", John Wiley&Sons, 1994. [8] W. Stallings, "Network and Internetwork Security: Principles and Practice", Prentice Hall, 1995.

[9] R. Gallager, "Information Theory and Reliable Communications", John Wiley&Sons, 1968.

References 1 through 9 are hereby incorporated herein by reference.

Having thus described our invention, what we claim as new and desire to secure by Letters Patents is:

1. A copy protection system for detecting unauthorized copying or distribution of a document, said system comprising:

a. means for generating a plurality of variants of said document, each variant of said document being generated by applying a particular set of variations to said document, where each variation is a change in the contents of said document but is not a modification in the meaning or perusal experience of said document;

b. a means for maintaining a database associating each of said variants of said document with a receiver; and c. a means for identifying a receiver of any one variant of said document using said database, wherein unauthorized copying or distribution of said document can be traced to said receiver according to which variant of said document was copied or distributed without authorization.

2. A method as recited in claim 1, wherein if said document is a textual document, then each said variation in content is a change to at least one symbol, and wherein if said document is an image or a video stream, then each said content variation is a change in visual qualities of at least one object, and wherein if said document is an audio stream, then each said content variation is a change in at least one total quality of at least one audio element in an audio stream.

3. A system as recited in claim 1, wherein one of said variations is the use of a pronoun in place of its antecedent in said document.

4. A system as recited in claim 1, wherein one of said variations is a synonym for a word used in said document.

5. A system as recited in claim 1, wherein one of said variations is an equivalent alternative spelling for a word in said document.

6. A system as recited in claim 1, wherein one of said variations is an alternative punctuation choice for punctuation in said document.

7. A system as recited in claim 1, wherein one of said variations is the reordering of some parts of said document.

8. A system as recited in claim 1, wherein one of said variations is the location of a figure in a page in said document.

9. A system as recited in claim 1, wherein one of said variations is the use of different symbols to label figures, footnotes, sections, references, citations, equations, and other parts in said document.

10. A system as recited in claim 1, wherein one of said variations is the use different equivalent representations of mathematical objects in said document.

11. A system as recited in claim 1, wherein said document contains a computer-generated picture or video stream, one of said variations is the use of different colors for certain objects in said picture or video stream.

12. A system as recited in claim 1, wherein said document contains a computer-generated picture or video stream, one of said variations is the absence or presence of certain inconspicuous objects in said picture or video stream.

13. A system as recited in claim 1, wherein said document contains a computer-generated picture or video stream, one of said variations is the location of certain objects in said picture or video stream.

14. A system as recited in claim 1, wherein said document contains a computer-generated picture or video stream, one of said variations is the size of certain objects in said picture or video stream.

15. A system as recited in claim 1, wherein said document contains a computer-generated picture or video stream, one of said variations is the size of certain objects in said picture or video stream.

16. A system as recited in claim 1, wherein said document contains a digital audio or musical track, one of said variations is the absence of presence of certain notes or segments in said track.

17. A system as recited in claim 1, wherein said document contains a digital audio or musical track, one of said variations is the variation in loudness of certain instruments or sound sources in said track.

18. A system as recited in claim 1, wherein said document contains a digital audio or musical track, one of said variations is the variation in speed of certain segments in said track.

19. A copy protection system arising in claim 1, further comprising:
   a. means for providing cryptographic authentication for detection of modifications to an original document (variant).

20. A copy protection system for detecting unauthorized copying or distribution of a document, said system comprising:
   a. means for associating a receiver of said document with information associated with said receiver; and
   b. hashing said information to a sequence of tagging vits; and
   c. preparing variants of said document in accordance with said sequence, wherein unauthorized copying or distribution of said document can be traced to said receiver according to which of said variants of said document was copied or distributed without authorization, wherein each of said variants is a variation of said document, where each variation is a change in the content of said document.

21. An apparatus arising in claim 20, wherein said sequence of tagging vits is augmented with some chosen vits which bind said sequence of tagging vits via a cryptographic operation for detecting alteration of said document.

22. A copy protection system comprising:
   a. means for associating a document receiver using information associated with said receiver;
   b. hashing said information to a sequence of tagging vits;
   c. preparing variants of said document in accordance with said sequence, wherein unauthorized copying or distribution of said document can be traced to said receiver according to which of said variants of said document was copied or distributed without authorization, wherein each of said variants is a variation of said document, where each variation is a change in the content of said document; and
   d. means for providing cryptographic authentication of variants to said sequence of tagging vits via cryptographic authentication of said sequence of chosen vits to detect modifications of said variants of said document.

* * * * *